(12) United States Patent
Kenney et al.

(10) Patent No.: US 9,729,268 B2
(45) Date of Patent: Aug. 8, 2017

(54) WIRELESS COMMUNICATION DEVICE AND METHOD FOR MULTI-MCS OFDM TRANSMISSIONS AT DIFFERENT TRANSMISSION POWER LEVELS

(75) Inventors: Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 13/993,304

(22) PCT Filed: Dec. 5, 2011

(86) PCT No.: PCT/US2011/063301
§ 371 (c)(1),
(2), (4) Date: Oct. 28, 2013

(87) PCT Pub. No.: WO2013/022468
PCT Pub. Date: Feb. 14, 2013

(65) Prior Publication Data
US 2015/0295676 A1    Oct. 15, 2015

Related U.S. Application Data

(60) Provisional application No. 61/515,680, filed on Aug. 5, 2011.

(51) Int. Cl.
*H04W 52/36* (2009.01)
*H04L 27/26* (2006.01)
(Continued)

(52) U.S. Cl.
CPC .......... *H04L 1/0003* (2013.01); *H04L 1/0009* (2013.01); *H04L 1/0015* (2013.01);
(Continued)

(58) Field of Classification Search
CPC ... H04L 1/0003; H04L 1/0009; H04L 1/0015; H04L 1/06; H04L 27/2627; H04L 5/0007;
(Continued)

(56) References Cited

U.S. PATENT DOCUMENTS 7,751,368 B2 * 7/2010 Li ........................ H04B 7/0632
370/332
9,049,239 B2    6/2015 Kenney et al.
(Continued)

FOREIGN PATENT DOCUMENTS

CN    101346959 A    1/2009
CN    102187613 A    9/2011
(Continued)

OTHER PUBLICATIONS

U.S. Appl. No. 13/993,287, filed Jun. 11, 2013, Wireless Device and Method for Low Power and Low Data Rate Operation.
(Continued)

*Primary Examiner* — Andrew Lai
*Assistant Examiner* — M Mostazir Rahman
(74) *Attorney, Agent, or Firm* — Schwegman Lundberg & Woessner, P.A.

(57) ABSTRACT

Embodiments of a wireless communication device and method for multi-MCS OFDM transmissions at different transmission power levels are generally described herein. In some embodiments, the wireless communication device may have a multi-MCS OFDM transmitter that is configured to encode data for transmission over two or more RF channels with a single encoding scheme to generate an encoded data stream. The transmitter may segment bits of the encoded data stream into a bit stream for each of the RF channels based on a selected modulation level for each of the two or more RF channels. A separate time-domain multicarrier waveform may be concurrently transmitted on each of the two or more RF channels at a power level that is selected not to exceed a maximum allowable transmit power level for that RF channel. The modulation level for each RF channel may be selected based at least in part on the maximum allowable transmit power level for that RF channel.

15 Claims, 4 Drawing Sheets

(51) Int. Cl.
*H04L 1/00* (2006.01)
*H04L 5/00* (2006.01)
*H04L 1/06* (2006.01)

(52) U.S. Cl.
CPC .............. *H04L 1/06* (2013.01); *H04L 5/0007* (2013.01); *H04L 5/0023* (2013.01); *H04L 5/0046* (2013.01); *H04L 27/2627* (2013.01); *H04W 52/367* (2013.01)

(58) Field of Classification Search
CPC ... H04L 5/0023; H04L 5/0046; H04W 52/367
See application file for complete search history.

(56) References Cited

U.S. PATENT DOCUMENTS

| | | | |
|---|---|---|---|
| 9,537,699 | B2 | 1/2017 | Kenney et al. |
| 2004/0042556 | A1 | 3/2004 | Medvedev et al. |
| 2006/0034382 | A1 | 2/2006 | Ozluturk et al. |
| 2007/0147226 | A1 | 6/2007 | Khandekar et al. |
| 2007/0183533 | A1* | 8/2007 | Schmidl ............... H04L 1/0003 375/299 |
| 2007/0248179 | A1 | 10/2007 | Hassan et al. |
| 2008/0176523 | A1 | 7/2008 | Sutton et al. |
| 2008/0233901 | A1* | 9/2008 | Ebiko ................. H04L 27/2624 455/114.2 |
| 2008/0311772 | A1 | 12/2008 | Osypka et al. |
| 2009/0052560 | A1 | 2/2009 | She et al. |
| 2009/0074094 | A1 | 3/2009 | Palanki et al. |
| 2009/0135922 | A1* | 5/2009 | Kang .................... H04L 5/0007 375/260 |
| 2009/0161783 | A1 | 6/2009 | Ozluturk |
| 2010/0316140 | A1 | 12/2010 | Razazian et al. |
| 2011/0038283 | A1* | 2/2011 | Yu ............................ H04L 5/143 370/277 |
| 2011/0096856 | A1 | 4/2011 | Sadowsky et al. |
| 2011/0237188 | A1* | 9/2011 | Sen ........................ H04B 15/00 455/41.2 |
| 2012/0257897 | A1 | 10/2012 | Hu et al. |
| 2014/0029681 | A1 | 1/2014 | Zhang et al. |
| 2014/0269770 | A1 | 9/2014 | Kenney et al. |
| 2015/0365265 | A1 | 12/2015 | Kenney et al. |

FOREIGN PATENT DOCUMENTS

| | | | |
|---|---|---|---|
| EP | 1641308 a1 * | 3/2006 | |
| JP | 2003169036 A | 6/2003 | |
| JP | 2008078790 A | 4/2008 | |
| JP | 2008510376 A | 4/2008 | |
| JP | 2009060662 A | 3/2009 | |
| JP | 5813871 B | 10/2015 | |
| KR | 20070091855 A | 9/2007 | |
| KR | 20110010107 A | 1/2011 | |
| WO | WO-2008155307 A1 | 12/2008 | |
| WO | WO-2013022468 A1 | 2/2013 | |
| WO | WO-2013077838 A1 | 5/2013 | |

OTHER PUBLICATIONS

"International Application Serial No. PCT/US2011/061653, International Search Report mailed Apr. 10, 2012", 3 pgs.
"International Application Serial No. PCT/US2011/061653, Written Opinion mailed Apr. 10, 2012", 4 pgs.
"International Application Serial No. PCT/US2011/063301 Search Report mailed Jun. 28, 2012", 7 pgs.
"International Application Serial No. PCT/US2011/063301, Written Opinion mailed Jun. 28, 2012", 5 pgs.
Heejung, Yu, et al., "Coverage extensions for IEEE802.11ah", (Jan. 2011), 5 pgs.
"International Application Serial No. PCT/US2011/061653, International Preliminary Report on Patentability mailed Jun. 5, 2014", 6 pgs.
"International Application Serial No. PCT/US2011/063301, International Preliminary Report on Patentability mailed Feb. 20, 2014", 7 pgs.
"3rd Generation Partnership Project, Technical Specification Group Services and System Aspects; IP flow mobilityand seamless Wireless Local Area Network (WLAN) of float", Stage 2(Release 10), 3GPP TS 23.261 V10.1.0, [Online] retrieved from the internet: <Search date: Dec. 5, 2014, URL, http://www.http://www.3gpp.org/ftp/specs/archive/23_series/23.261/>, (Sep. 29, 2010), p. 6.
"U.S. Appl. No. 13/993,287, Notice of Allowance mailed Jan. 14, 2015", 9 pgs.
"U.S. Appl. No. 14/719,733, Non Final Office Action mailed Mar. 10, 2016", 10 pgs.
"U.S. Appl. No. 14/719,733, Preliminary Amendment filed Sep. 8, 2015", 10 pgs.
"U.S. Appl. No. 14/719,733, Response filed Jun. 10, 2016 to Non Final Office Action mailed Mar. 10, 2016", 11 pgs.
"Chinese Application Serial No. 201180074970.0, Office Action mailed Jun. 13, 2016", Without English Translation, 11 pgs.
"European Application Serial No. 11870676.1, Extended European Search Report mailed Feb. 19, 2015", 9 pgs.
"European Application Serial No. 11870676.1, Response filed Sep. 17, 2015 to Extended European Search Report mailed Feb. 19, 2015", 17 pgs.
"Japanese Application Serial No. 2014-523908, Office Action mailed Dec. 16, 2014", W/ English Translation, 9 pgs.
"Japanese Application Serial No. 2014-523908, Response filed Mar. 13, 2015 to Office Action mailed Dec. 16, 2014", W/ English Claims, 12 pgs.
"Korean Application Serial No. 2014-7005385, Non Final Office Action mailed Feb. 17, 2015", W/ English Translation, 14 pgs.
"Korean Application Serial No. 2014-7005385, Notice of Final Rejection mailed Aug. 20, 2015", W/ English Translation, 6 pgs.
"Korean Application No. 2014-7005385, Response filed Apr. 17, 2015 to Notice of Final Rejection mailed Feb. 17, 2015", W/ English Claims, 29 pgs.
Minyoung, Park, "TGah use cases summary and aggregated PHY rates analysis; 11-11-0299-00-00ah-tgah-use-cases-summary-and-aggregated-phy-rates-analysis", IEEE SA Mentor, 11-11-0299-00-00AH-TGAH-USE-CASES-SUMMARY-AND-AGGREGATED-PHY-RATES-ANALYSIS vol. 802.11ah (Mar. 13, 2011), 1-11.
Park, Minyoung, et al., "Use Cases Summary and Aggregated PHY Rates Analysis", IEEE 802.11-1110299r0, [Online] retrieved from the internet: <Search date: Dec. 5, 2014, URL, https://mentor.ieee.org/802.11/documentsis_dcn=Intel&is_group=00ah&is_year=2011>, (Mar. 13, 2011), pp. 7, 11.
Ron, Porat, "S1G Spectrum Regulations; 11-11-0685-00-00ah-s1g-spectrum-regulations", IEEE SA Mentor; 11-11-0685-00-00AH-S1G-SPECTRUM-REGU LATIONS vol. 802.11ah, (May 7, 2011), 1-10.
"U.S. Appl. No. 14/719,733, Notice of Allowance mailed Aug. 24, 2016", 11 pgs.
"Chinese Application Serial No. 201180074970.0, Office Action mailed Feb. 8, 2017", 11 pgs.
"Chinese Application Serial No. 201180074970.0, Response filed Oct. 27, 2016 to Office Action mailed Jun. 13, 2016".

* cited by examiner

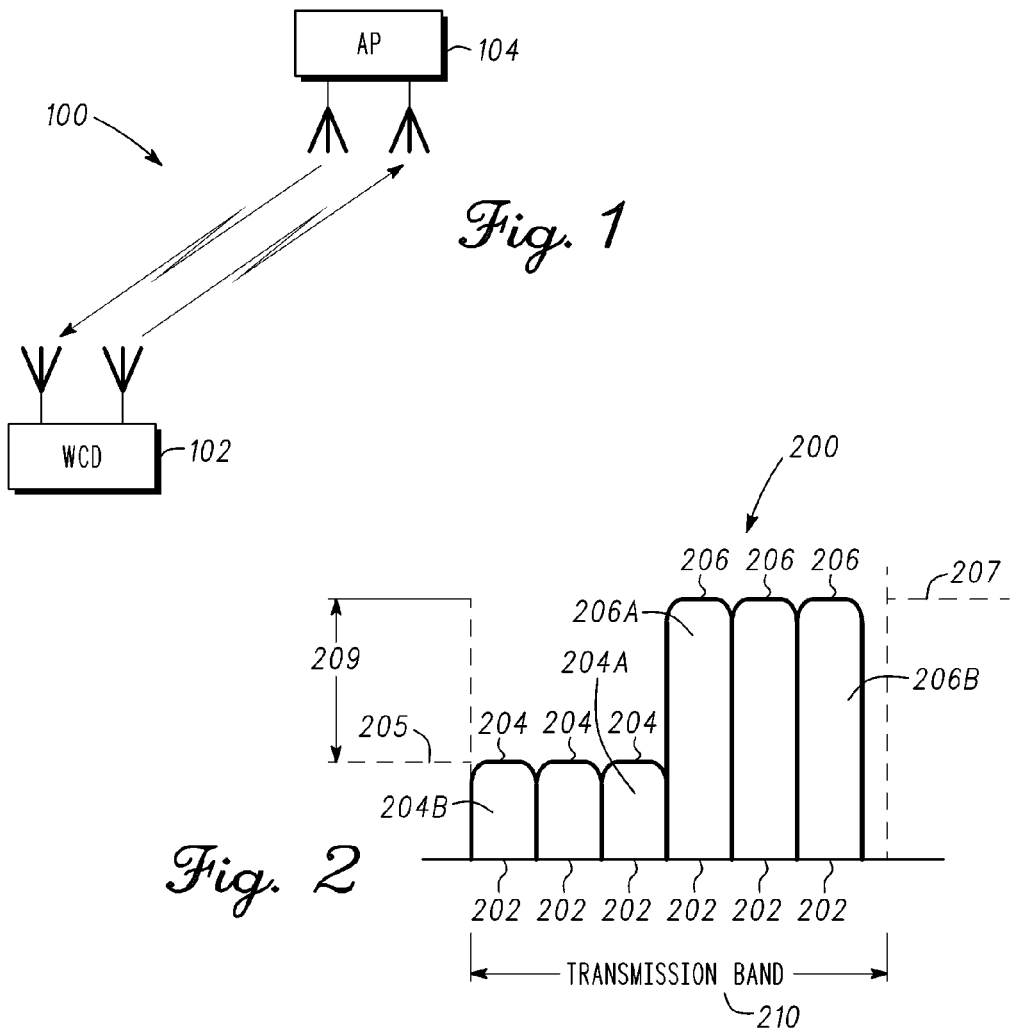

WIRELESS COMMUNICATION DEVICE AND METHOD FOR MULTI-MCS OFDM TRANSMISSIONS AT DIFFERENT TRANSMISSION POWER LEVELS

RELATED APPLICATION

This application is a U.S. National Stage Filing under 35 U.S.C. 371 from International Application No. PCT/US2011/063301, filed Dec. 5, 2011 and published in English as WO 2013/022468 on Feb. 14, 2013, which claims priority under 35 U.S.C. 119(e) to U.S. Provisional Patent Application Ser. No. 61/515,680, filed Aug. 5, 2011, all of which are incorporated herein by reference in their entireties.

This application is related to PCT patent application entitled "WIRELESS DEVICE AND METHOD FOR LOW POWER AND LOW DATA RATE OPERATION" PCT/US11/61653 filed Nov. 21, 2011.

TECHNICAL FIELD

Embodiments pertain to wireless communications. Some embodiments relate to multi-MCS orthogonal frequency division multiplexed (OFDM) transmissions at different power levels. Some embodiments, relate to OFDM transmissions in the 1 GHz and lower frequency bands, including the 800 MHz to 1000 MHz unlicensed bands.

BACKGROUND

One issue with communicating data over the 1 GHz and lower bands is that in some jurisdictions, the available channels do not have the same maximum allowable transmit power requirement. This makes it difficult to efficiently utilize these channels. Some cellular networks would like to offload some of their data communications to other networks such as Wi-Fi networks, and the 1 GHz and lower bands may have the available capacity and spectrum to handle this offloading.

Thus, there are general needs for wireless communication devices and methods that can efficiently utilize channels that do not have the same maximum allowable transmit power requirement. There are also general needs for wireless communication devices and methods that can efficiently utilize channels that do not have the same maximum allowable transmit power requirement in the 1 GHz and lower bands. There are also general needs for wireless communication devices and methods for offloading data communications from cellular networks to wireless networks, including wireless networks having channels that do not have the same maximum allowable transmit power requirement.

BRIEF DESCRIPTION OF THE DRAWINGS

FIG. 1 illustrates a wireless network in accordance with some embodiments;

FIG. 2 illustrates an example channel band in accordance with some embodiments.

FIG. 4 illustrates example paired modulation levels in accordance with some embodiments;

DETAILED DESCRIPTION

Figure 3:
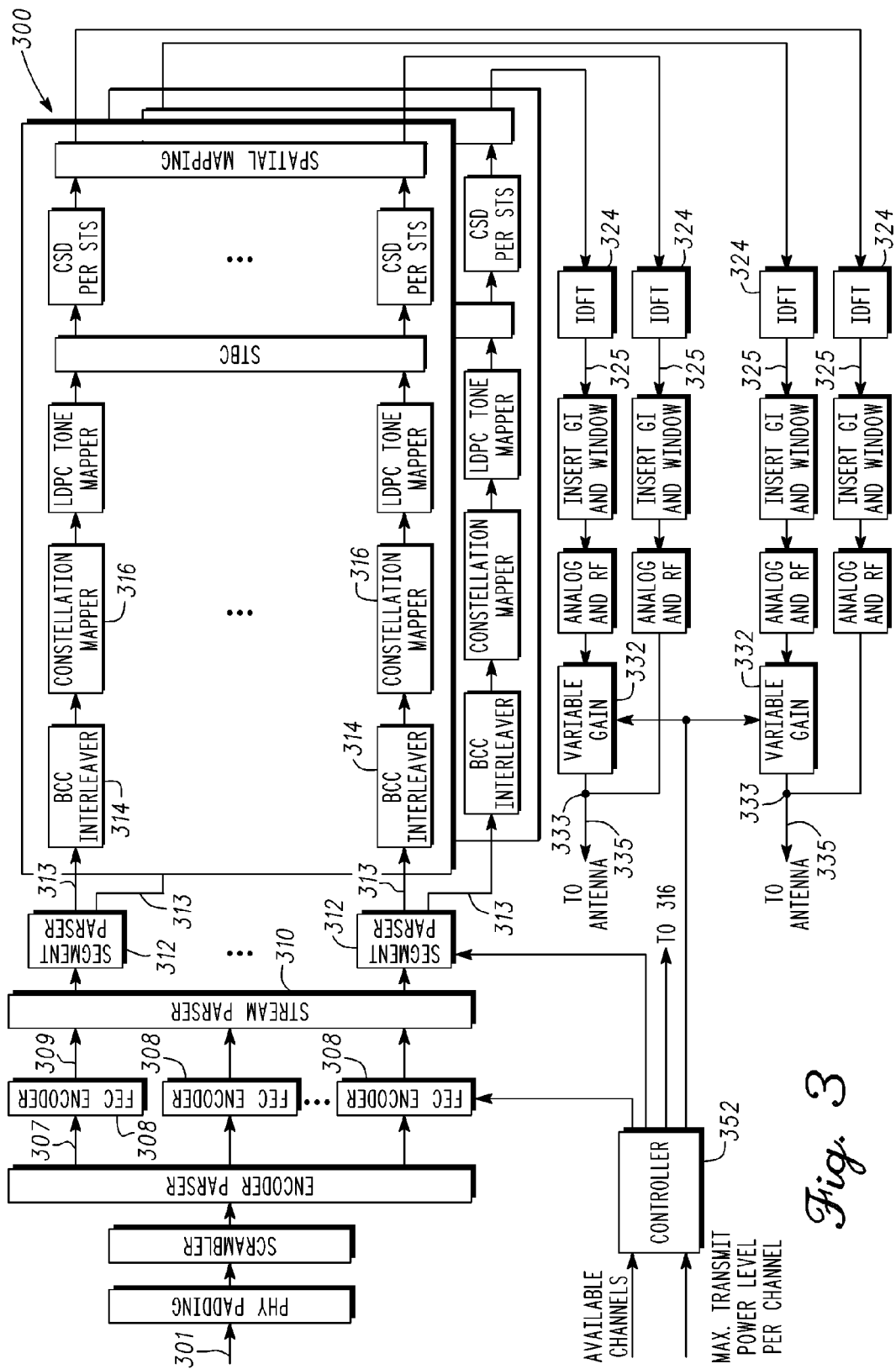
FIG. 3 is a functional block diagram of an OFDM transmitter in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a wireless network in accordance with some embodiments. Wireless network 100 may include one or more wireless devices such as wireless communication device (WCD) 102 and an access point (AP) 104 or base station. The AP 104 may be coupled to a network, such as to the Internet, to facilitate communications between the wireless communication device 102 and other entities.

In accordance with embodiments, the wireless communication device 102 includes a multi-MCS OFDM transmitter for multiband transmissions. In these embodiments, higher modulation levels may be used on RF channels in which greater transmit power levels are allowed allowing for more channel choices in congested networks and providing higher throughput. Furthermore, these embodiments provide for better utilization of available channels by using different modulation levels depending on the maximum allowable transmit power. The RF channels may occupy spectrum between 800 MHz and 1000 MHz, although this is not a requirement. Each RF channel may have a transmission bandwidth of approximately 1 MHz or in some cases, 2 MHz, although this is not a requirement.

In some embodiments, the multi-MCS OFDM transmitter of wireless communication device 102 may be configured for multiband transmissions. In these embodiments, the multi-MCS OFDM transmitter may encode data for transmission over two or more RF channels with a single encoding scheme to generate an encoded data stream. The multi-MCS OFDM transmitter may also segment bits of the encoded data stream into a bit stream for each of the RF channels based on a selected modulation level for each of the two or more RF channels. The multi-MCS OFDM transmitter may also concurrently transmit a separate time-domain multicarrier waveform on each of the two or more selected RF channels at a power level that is selected not to exceed an maximum allowable transmit power level for that RF channel. The modulation level for each RF channel may be selected based at least in part on the maximum allowable transmit power level for that RF channel. In some embodiments, the multi-MCS OFDM transmitter may be configured to support multi-MCS mode transmissions in accordance with the IEEE 802.11ah communication standard.

In some embodiments, the multi-MCS OFDM transmitter of wireless communication device 102 may configure each RF channel to have a 1 MHz or 2 MHz transmission bandwidth by down-clocking a sample clock rate clock signal. These embodiments may allow for the use of conventional OFDM transmitters configured for IEEE 802.11ac communications with minimal modifications. These embodiments are discussed in more detail below.

In some embodiments, the wireless communication device 102 may include a cellular transceiver for communicating with base stations of a cellular network in accordance with cellular communication techniques and a wireless network transceiver for communicating with access points of wireless network (i.e., such as access point 104) in accordance with a wireless network communication technique at frequencies between 700 MHz and 1000 MHz. The upper-level layers of the wireless communication device may be configured to offload data communications from the cellular network to an available wireless network. In these embodiments, the offloaded data may be configured for a multi-MCS transmission over two or more RF channels as described herein. In some of these embodiments, the wireless communication device 102 may be a smart phone or other device that communicates data, although this is not a requirement.

In some embodiments, wireless communication device 102 may be part of any portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the wireless communication device 102 may include one or more of a keyboard, a display, a non-volatile memory port, multiple antennas, a graphics processor, an application processor, speakers, and other mobile device elements. The display may be an LCD screen including a touch screen.

In some embodiments, the multi-MCS OFDM transmitter may utilize a single antenna and may be configured with two RF chains. These embodiments are discussed in more detail below.

FIG. 2 illustrates an example channel band in accordance with some embodiments. Channel band 200 illustrates six RF channels 202 that occupy transmission band 210. Some RF channels 202, such as channels 206, may have a higher maximum allowable transmit power level 207 and some channels 202, such as channel 204, may have a lower maximum allowable transmit power level 205. The number of channels 202, the channel bandwidth, the maximum allowable transmit power levels 205 and 207, and the particular transmission band 210 may be based on a particular jurisdiction. Due to the disproportionate maximum power limitation between some of the RF channels 202, it becomes difficult to efficiently utilize this type of transmission band 210 for transmissions on more than one RF channel (i.e., multiband operation). Channel 204 and channel 206 have a power level difference 209.

One approach to a multiband operation in these types of transmission bands may use the lower maximum allowable transmit power level 205 for all channels across the transmission band 210 during multi-bandwidth transmissions. A drawback to this approach is that substantial reduction in throughput would result since the channel with higher allowable power level would be operating at a much lower transmit power level resulting in a lower data rate. This not only reduces the throughput for that device, but also potentially for other devices operating on the channel with higher allowable power level since these other devices would have less time to access the wireless medium.

Another approach could avoid using channels that have a disparity in the maximum allowable transmit power levels. This approach however limits the channel selections available to wireless devices reducing the likelihood of being able to find open channels for multi-channel transmissions. Furthermore, in some jurisdictions, there are less than four channels with the same maximum allowable transmit power level, and in some jurisdictions, there may be only two channels with the same maximum allowable transmit power level. This approach would result in a significant reduction in system throughput.

In accordance with some embodiments, the wireless communication device 102 (FIG. 1) may select a modulation level and power level for each channel 202 independently. This is unlike conventional approaches that spread the data over the entire channel (in a multi-channel transmission) using one MCS to afford frequency diversity gain. In these conventional approaches, since there is a disproportionate amount of power available on the different channels, using one MCS would result in an underutilized system since a lower MCS (lower data rate) would have to be used on a channel that may be able to support a higher modulation level.

In accordance with some embodiments, the multi-MCS OFDM transmitter of wireless communication device 102 may select two different modulation levels for RF channels 202 having different power requirements, which may help optimize system throughput. In some embodiments, a scaling block may be used for the higher power channel to help maximize the possible MCS combinations to be used and to reduce power consumption if needed. These embodiments are discussed in more detail below.

In accordance with embodiments, multi-MCS OFDM transmitter may encode data for transmission over two or more RF channels 202 with a single encoding scheme to generate an encoded data stream and may segment the bits of the encoded data stream into a bit stream for each of the RF channels 202 based on a selected modulation level for each of the two or more RF channels 202. The encoding scheme may be a forward error-correcting (FEC) encoding scheme. The transmitter may also be configured to concurrently transmit a separate time-domain multicarrier waveform on each of the two or more RF channels at a power level that is selected not to exceed the maximum allowable transmit power level for that RF channel. The modulation level for each RF channel 202 may be selected based at least in part on the maximum allowable transmit power levels 205, 207 for that RF channel 202.

In some embodiments, higher modulation levels may be used on RF channels 202 in which greater transmit power levels are allowed allowing for more channel choices in congested networks and providing higher throughput. These embodiments provide for better utilization of available channels by using different modulation levels depending on the maximum allowable transmit power.

In some embodiments, a separate time-domain multicarrier waveform is concurrently transmitted on each of the two or more RF channels 202 with a single antenna at a power level selected not to exceed the maximum allowable transmit power level for that RF channel. In some embodiments, the selected RF channels 202 may be adjacent RF channels within the spectrum (i.e., occupy adjacent portions of spectrum, such as channels 204A and 206A), while in other embodiments, the selected RF channels may be non-contiguous RF channels within the spectrum (i.e., occupy non-adjacent portions of spectrum, such as channels 204B and 206B).

FIG. 3 is a functional block diagram of a multi-MCS OFDM transmitter in accordance with some embodiments. The multi-MCS OFDM transmitter 300 may be suitable for use as the multi-MCS OFDM transmitter of wireless communication device 102 (FIG. 1), although other configurations may also be suitable. The multi-MCS OFDM transmitter 300 may be part of the physical layer (PHY layer) of wireless communication device 102. The wireless communication device 102 may include other layer circuitry, including media-access control (MAC) layer circuitry, as well as receiver circuitry that is part of the PHY layer that are not illustrated. In general, the multi-MCS OFDM transmitter 300 may receive a MAC layer data 301, may process the data and may generate OFDM signals 335 for transmission by one or more antennas.

In accordance with embodiments, the multi-MCS OFDM transmitter 300 may include an encoder 308 to encode data 307 for transmission over two or more RF channels 202 (FIG. 2) with a single encoding scheme to generate an encoded data stream 309. A segment parser 312 may be configured to segment bits of the encoded data stream 309 into a bit stream 313 for each of the RF channels 202 (FIG. 2) based on a selected modulation level for each channel 202. A separate time-domain multicarrier waveform 325 may be generated by inverse discrete Fourier transform (IDFT) circuitry 324 for concurrent transmission on each of the two or more RF channels with a single antenna at a power level selected not to exceed the maximum allowable transmit power level for that RF channel.

The multi-MCS OFDM transmitter 300 may also include constellation mappers 316 configured to map segmented data 313 intended for each RF channel to constellation symbols based as on the selected modulation level. The IDFT circuitry 234 (FIG. 2) may perform an IDFT on the constellation-mapped data for each RF channel to generate a time-domain multicarrier waveform 325 for each RF channel. The time-domain multicarrier waveform 325 of each RF channel may be combined by a combining element 333 for concurrent transmission on a single antenna.

In some embodiments, a variable gain element 332 may be included to adjust the transmit power level of the time-domain multicarrier waveform 325 associated with the higher power level and higher modulation level channel to meet a predetermined performance level. This is discussed in more detail below.

In some embodiments the multi-MCS OFDM transmitter 300 may include an encoder 308 associated with each antenna of a plurality of antennas. The encoders 308 may be configurable to allow data to be encoded for transmission by each of the antennas with a different encoding scheme as each encoder may use one encoding scheme. The multi-MCS OFDM transmitter 300 may be configured to concurrently transmit a separate time-domain multicarrier waveform comprising OFDM signals 335 on each of two or more RF channels with a single one of the antennas. In these embodiments, the encoding scheme may be the same for each of the RF channels transmitted by a same antenna, however a different modulation level may be used for each channel transmitted by the same antenna depending on the allowable transmit power for that channel.

As illustrated in FIG. 3, different constellation mappers 316 may be utilized for each segmented stream 313, however the streams from the same encoder 308 are eventually combined by a combining element 333 for transmission by one of the antennas. In this way, each antenna may be associated with a single encoding scheme but a different modulation level for the RF channels being transmitted by that antenna is allowable.

In some embodiments, higher modulation levels are selected for RF channels 202 having a higher allowed transmit power level (i.e., channels 206 (FIG. 2)) and lower modulation levels are selected for RF channels 202 having a lower allowed transmit power level (i.e., channel 204 (FIG. 2)). In some embodiments, the allowed transmit power for an RF channel 202 may be determined based on regulations of the jurisdiction in which the wireless communication device 102 is located.

In some embodiments, the wireless communication device 102 may be configured to receive signals from an access point 104 (FIG. 1) (or base station) that indicate the available RF channels and the maximum allowable transmit power level for each of the available RF channels. In some embodiments, the signals may be beacon signals.

The multi-MCS OFDM transmitter 300 may include a controller element 352 or other processing circuitry configured to select the coding rate for the encoders 308, select the modulation level for the constellation mappers 316, and determine the number of bits that segment parsers 312 may segment based on a selected modulation level for each the available RF channels. The controller element 352 may be configured to perform other control functions described herein.

In some embodiments, the multi-MCS OFDM transmitter 300 may include more than one RF chain associated with a single antenna. FIG. 3 illustrates two RF chains associated with each transmit antenna although this is not a requirement. Each RF chain may be associated with stream of data. As illustrated, the variable gain element 332 may be associated with at least one of the RF chains associated with a single antenna and may configure the time-domain multicarrier waveform 325 of an RF channel to have a power level is selected to support a predetermined performance level and not to exceed the maximum allowable transmit power level for that RF channel. In some embodiments, the RF channel that utilizes a higher modulation level may be the RF chain that has the variable gain element 332. In this way, the signals transmitted on the two RF channels by the same antenna may have different power levels so that regulatory requirements of a jurisdiction may be met while maximizing data throughput. This may allow the power level of the higher power channel to be reduced to a level below the maximum allowable level and yet meet a predetermined performance level. In some embodiments, the predetermined performance level may be a minimum energy per bit, a maximum frame error rate (e.g., 1%) or a target error rate for the modulation and coding scheme.

In some embodiments, the multi-MCS OFDM transmitter 300 may configure each RF channel 202 to have a transmission bandwidth of approximately either 1 MHz or 2 MHz by down-clocking a sample clock rate clock signal. The time-domain multicarrier waveform transmitted on each RF channel may be an OFDM signal that comprises a plurality of subcarriers (tones). The selected RF channels 202 may occupy spectrum (i.e., transmission band 210) between 700 MHz and 1000 MHz.

The variable gain element 332 may comprise analog circuitry and may operate on analog signals as illustrated in FIG. 3. In other embodiments, the variable gain element 332 may be configured to control the gain digitally and may be part of controller element 352, or may be provided before an analog-to-digital converter (ADC) after the IDFT element 324.

In some embodiments, a conventional IEEE 802.11ac transmitter may be modified to support multi-MCS mode in accordance with an IEEE 802.11ah standard as described herein. In these embodiments, a physical layer data unit (PSDU) length calculation and MAC and PHY padding calculations may be modified, including a transmission time calculation. In some embodiments, the PSDU length may be calculated based on the following equation:

$$PSDU_{Len} = \left\lfloor \frac{N_{SYM} N_{DBPS_{avg}}/NF - N_{Service} - N_{Tail}N_{ES}}{8} \right\rfloor$$

Where $N_{DPBPS_{avg}}$ is the average of the two modulation types, and the number of channels that each modulation type is being used and may be calculated as follows:

$$N_{DPBPS_{avg}} = \frac{kN_{DPBPS_1} + lN_{DPBPS_2}}{2},$$

where k and l are the number of channels the first and second modulation type are being used respectively. In this equation, NF may be a nulling factor which may refer to a number of tones that may be nulled for an improved peak-to-average power ratio (PAPR). In these embodiments, NF may equal 1 in which no tones are nulled. In this example, only two modulation types are considered to account for the two different power levels, however this can be extended for other allocations.

Once the number of symbols and the PHY and MAC padding are computed, the processing within transmitter 300 may follow a conventional IEEE 802.11ac flow until the stream parser 310. The stream parser 310 may parse groups encoded bits onto a single axis (real or imaginary) based on constellation.

After coding and puncturing, the data bit streams at the output of the FEC encoders 308 may be re-arranged into $N_{SS}$ blocks of $N_{CBPSS}$ bits. This operation may be referred to as "stream parsing".

The number of bits assigned to a single axis (real or imaginary) in a constellation point in a spatial stream may be denoted by:

$$s = \max\left\{1, \frac{N_{BPSCS}}{2}\right\}$$

Where:
$N_{BPSCS}$ is the number of coded bits per subcarrier per spatial stream,
$N_{CBPSS}$ is the number of coded bits per symbol per spatial stream, and
$N_{SS}$ is the number spatial streams.

The sum of these over all the streams may be:

$$S = \sum_{i_{SS}=0}^{N_{SS}-1} s = N_{SS} \cdot s$$

In this example, this equation may be modified to use different modulation types (however in this example only two types at a time may be allowed). This then is expressed as:

$$s_m = \max\left\{1, \frac{N_{BPSCS,m}}{2}\right\}, m = 1, 2$$

Where $N_{BPSCS,m}$=the number of coded bits per subcarrier per spatial stream for each modulation type used.

Then the sum over all streams is now:

$$S = \sum_{m=1}^{2} \sum_{i_{ss}=0}^{N_{ss,m}-1} s_m$$

Where $N_{ss,m}$ is the number of spatial streams allocated per modulation type (channel).

These streams may be put into blocks where the blocks are the parsed to segments (channels) and the parsing may be done based on modulation type. Thus, only one modulation type would be sent to each of the channels.

Following the segment parser 312, an interleaver 314 may perform an interleaving operation based on the number of bits available for each modulation type. Each of the constellation mappers 316 may be configured to map the bits based on the selected modulation level. As can be seen, each channel is processed based on the modulation type.

In some embodiments, elements of the multi-MCS OFDM transmitter 300 may be down clocked to generate an OFDM transmission symbol for transmission over/within a reduced transmission bandwidth as compared with conventional IEEE 802.11 transmissions. In these embodiments, the IDFT element 324 and a subsequent digital-to-analog (D/A) converter element may operate at a down-clocked sample clock rate. The down clocking may be configured by the controller element 352 to provide a reduced transmission bandwidth compared to a more conventional IEEE 802.11n/ac configured transmitter.

In some embodiments, the time-domain signal that is transmitted by the transmitter 300 may have a transmission bandwidth based on a sample clock rate clock signal. The IDFT performed by IDFT element 324 may be performed based on the sample clock rate clock signal and the digital-to-analog conversion performed by a D/A converter element on the time-domain signal may also be based on the sample clock rate clock signal to generate an OFDM transmission symbol having a reduced transmission bandwidth. In these embodiments, the sample clock rate clock signal may be a down-clocked sample clock rate configured to reduce the transmission signal bandwidth by a factor of ten or more. In some embodiments, the controller element 352 may configure clock circuitry to down-clock the sample clock rate to generate a clock signal having a down-sampled sample clock rate for use by IDFT element 324 and the D/A converter element.

The use of a down-clocked sample clock of one-tenth, for example, may allow a 20 MHz waveform to fit within a 2 MHz transmission bandwidth. In these embodiments, the down clocking slows the transmitter's clocks down (in this example by 1/10) while increasing the OFDM symbol time without affecting the number of tones of each OFDM symbol. In the frequency domain, since there is less bandwidth utilized and the tone spacing is closer. Tones, as used herein, may refer to subcarriers.

In these embodiments, a down-sampled sample clock rate of about one-tenth or one-twentieth the sample clock rate of a conventional WLAN system (i.e., configured in accordance with IEEE 802.11n) may be provided to the IDFT element 324 and the D/A converter element so that a significantly reduced transmission bandwidth compared to that of a conventional WLAN system may be used.

In these example embodiments when the sample clock rate is down clocked by one-twentieth or one-tenth, a 20 MHz IEEE 802.11ac bandwidth that uses 52 tones may be reduced to either a 1 or 2 MHz bandwidth that uses 52 more closely-spaced tones, a 40 MHz IEEE 802.11ac bandwidth that uses 108 tones may be reduced to either a 2 or 4 MHz bandwidth that uses more closely-spaced 108 tones, an 80 MHz IEEE 802.11ac bandwidth that uses 234 tones may be reduced to either a 4 or 8 MHz bandwidth that uses 234 more closely-spaced tones, and a 160 MHz IEEE 802.11ac bandwidth that uses 468 tones may be reduced to either an 8 or 16 MHz bandwidth that uses 468 more closely-spaced tones, depending on the down sampling. In this way, IEEE 802.11n/ac transmitters may be used to transmit low-data rate data over significantly narrower bandwidths using significantly less power. The use of a down-sampled clock rate may increase the OFDM symbol length in time.

In some embodiments, the analog and RF circuitry may be configured to up-convert the time domain signals from the IDFT element 324 to a transmission frequency of between 700 MHz and 1.0 GHz and amplify the signals at the transmission frequency with one or more power amplifiers. The time-domain signals for transmission generated by the IDFT element 324 comprise a plurality of tones (i.e., sub-carriers) that are evenly spaced across the transmission bandwidth.

In some embodiments, the multi-MCS OFDM transmitter 300 may be configured for frequency selective transmission. In these embodiments, a transmission frequency of 1 GHz or less may be selected. In some alternate embodiments, the active tones may be selected based on channel conditions rather than being spaced out evenly across the transmission bandwidth. In these embodiments, the AP 104 (FIG. 1) may perform channel estimation and indicate to the transmitter 300 which tones should be used as active tones. In other embodiments, the transmitter 300 may perform a channel estimation to determine which tones to select as active tones.

In some example embodiments in which the sample clock rate is down-clocked by one-tenth, the transmission bandwidth may comprise a bandwidth of 2 MHz, 4 MHz, 8 MHz or 16 MHz using sets of 52, 108, 234 or 468 tones, respectively. In some other example embodiments in which sample clock rate is down-clocked by one-twentieth, the transmission bandwidth may comprise a bandwidth of 1 MHz, 2 MHz, 4 MHz or 8 MHz using sets of 52, 108, 234 or 468 tones, respectively. In some embodiments, the transmission bandwidth may be as little as 1 MHz or less and may be as large as 10 MHz or greater depending on the down clocking of the sample clock rate.

Although the multi-MCS OFDM transmitter 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the multi-MCS OFDM transmitter 300 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors and may be configured with instructions stored on a computer-readable storage device.

FIG. 4 illustrated paired MCS levels 400 in accordance with some embodiments. Each MCS level may be associated with an MCS index in column 405, which may be defined by a modulation level shown in column 407 and a coding rate shown in column 409. As illustrated, MCS levels 401 have the same coding rate of ½, MCS levels 402 have the same coding rate of ¾, and MCS levels 403 have the same coding rate of ⅚. Column 411 illustrates an example energy per bit level that may be needed to achieve a predetermined quality level. Columns 412 illustrate the differences in between the levels of column 411.

In accordance with some embodiments, the multi-MCS OFDM transmitter 300 (FIG. 3) may select a modulation level for each RF channel 202 (FIG. 2) based on channel feedback (i.e., a channel quality measurement such as SNR) in addition to the allowed maximum transmit power level for that channel. The selected modulation levels for RF channels transmitted by the same antenna may be restricted to paired modulation levels associated with a same code rate. When a first of the RF channels has a lower maximum allowable transmit power level (i.e., channel 204A (FIG. 2)) and a second of the RF channels has a higher maximum allowable transmit power level (i.e., channel 206A (FIG. 2)), based on a difference 209 (FIG. 2) between the higher and lower maximum allowable transmit power level, paired modulation levels may be selected for these RF channels such that a power level difference shown in column 412 between the paired modulation levels needed to support a predetermined quality level does not exceed the difference 209 between the higher and lower maximum allowable transmit power levels.

In an example embodiment in which the difference 209 (FIG. 2) between the higher and lower maximum allowable transmit power level is about 10 dB, paired modulation levels may be selected as long the power level difference between the paired modulation levels to support a predetermined quality level does not exceed 10 dB. In the example illustrated in FIG. 4, paired modulation levels of BPSK and QPSK for code rate ½ may be selected since only a 3 dB difference is needed to support a predetermined quality level. Paired modulation levels of BPSK and 16QAM for code rate ½ may also be selected since only an 8 dB difference in transmit power level is needed to support a predetermined quality level. Paired modulation levels of 16QAM and 64QAM for code rate ¾ may also be selected since only a 5.5 dB difference in transmit power level is needed to support a predetermined quality level.

Paired modulation levels of QPSK and 64QAM for code rate ¾, however, may require an 11 dB difference to most efficiently utilize the channels. If the channel with the higher modulation level is experiencing a 1 dB or more better channel conditions (e.g., less loss due to fading) than the channel with the lower modulation level, the paired modulation levels of QPSK and 64QAM for code rate ¾ may, for example, be suitable for use in the situation when the difference 209 between the higher and lower maximum allowable transmit power level is about 10 dB.

In some embodiments, a lower modulation level and lower transmit power level may be chosen for the higher power channel to reduce power consumption in situations (i.e., not much data to send) and to help balance the power levels between the channels. Furthermore, a lower modulation level and lower transmit power level may be chosen for the higher power channel when a lower performance level is acceptable.

As can be seen in FIG. 4, this pairing allows for several selections in the MCS to be used. The several differences in columns 412 show that there is ample opportunity to tune the system for different channel conditions on each of the separate channels to account for performance difference based on the channel performance. In the upper end where code rate ⅚ may be used, there is only one selection (i.e., 64 QAM and 256 QAM) illustrated. For this case, if the lower power channel can support a 64 QAM transmission at code rate ⅚ , then the higher power channel may only require only an additional 5 dB separation, which would not be a limitation when the allowable differences between the channels is greater than 5 dB. In many jurisdictions, the allowable power difference between channels may be on the order of 10 dB.

Figure 5A:
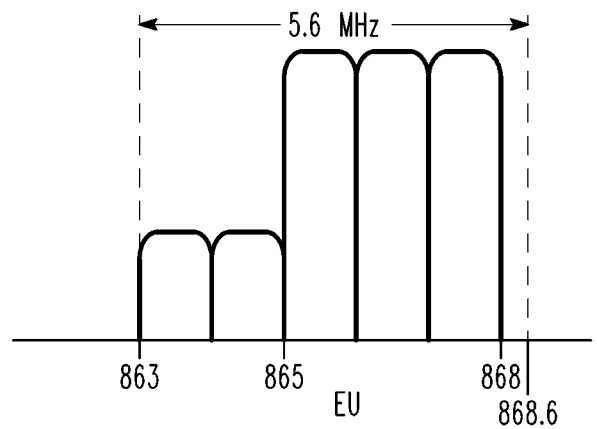
FIGS. 5A, 5B and 5C illustrate channel bands of various jurisdictions in accordance with some embodiments.
Figure 5B:
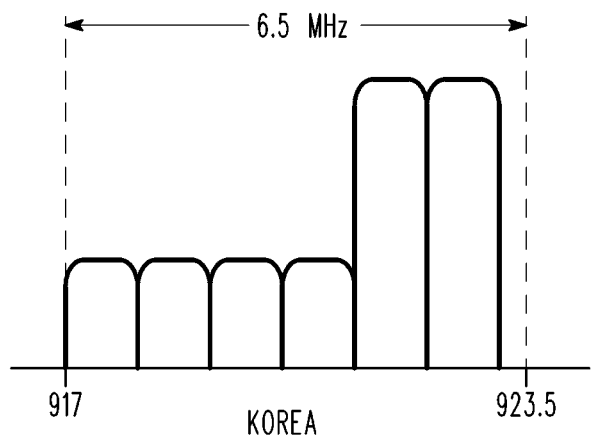
Figure 5C:
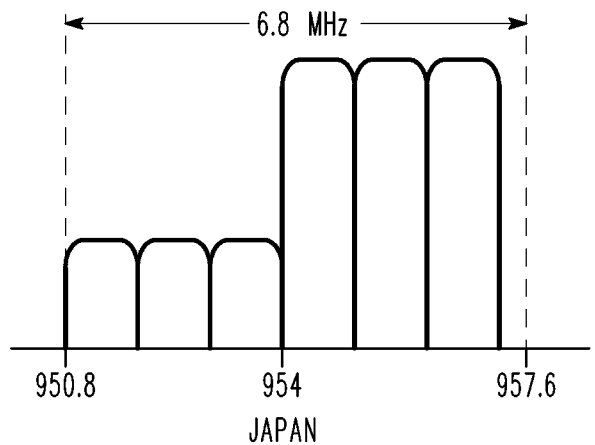

FIGS. 5A, 5B and 5C illustrate channel bands of various jurisdictions in accordance with some embodiments. FIG. 5A illustrates that in the European Union (EU), two RF channels in the 863 to 868.6 MHz band have a lower maximum allowable transmit power level and three channels have a higher maximum allowable transmit power level. FIG. 5B illustrates that for the Korea, four RF channels in the 917 to 923.5 MHz band have a lower maximum allowable transmit power level and two channels have a higher maximum allowable transmit power level. FIG. 5C illustrates that in Japan, three RF channels in the 950.8 to 957.6 MHz band have a lower maximum allowable transmit power level and three channels have a higher maximum allowable transmit power level. In accordance with embodiments, the multi-MCS OFDM transmitter 300 (FIG. 3) may be configured for multiband transmissions in any of these jurisdictions and may concurrently transmit a separate time-domain multicarrier waveform on each of the two or more RF channels at a power level that is selected not to exceed an maximum allowable transmit power level for that RF channel. The modulation level for each RF channel may be selected based at least in part on the maximum allowable transmit power level for that RF channel in that jurisdiction. This may provide for better utilization of the available RF channels by using different modulation levels that depend on the maximum allowable transmit power as well as an acceptable performance level.

Figure 6:
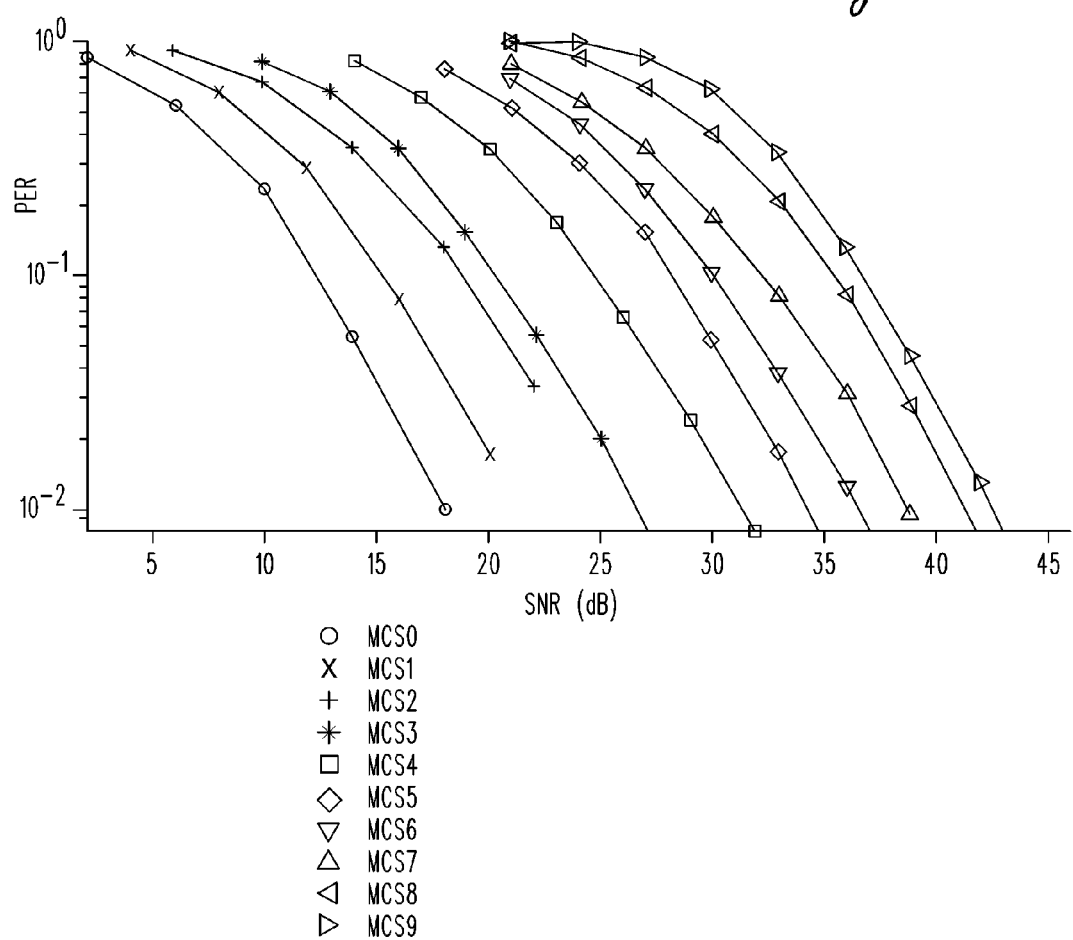
FIG. 6 illustrates packet-error-rate performance for various modulation and coding schemes (MCS) in accordance with embodiments.

FIG. 6 illustrates packet-error-rate (PER) performance for various modulation and coding schemes (MCS) in accordance with embodiments. As can be seen from FIG. 6, better channel conditions (e.g., a higher signal-to-noise (SNR) ratio) may be needed for the higher MCS levels to achieve the same PER performance as a lower MCS level. In this way, paired modulation levels for the same coding rate may be selected for efficient use of the available channels depending on the maximum allowable transmit power levels for those RF channels.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising a memory; and, a multi-modulation and coding schemes (MCS) orthogonal frequency division multiplexed (OFDM) transmitter coupled to the memory, wherein the multi-MCS OFDM transmitter comprises:
at least one radio frequency (RF) chain associated with a single transmit antenna; and
a variable gain element associated with the at least one of the RF chain to configure separate time-domain multicarrier waveform of an RF channel to have a power level that is selected to support a predetermined performance level and to not exceed a maximum allowable transmit power level for that RF channel, the multi-MCS OFDM transmitter configured to:
encode data for transmission over two or more RF channels with a single encoding scheme to generate an encoded data stream;
segment bits of the encoded data stream into a bit stream for each of the two or more RF channels based on a selected modulation level for each of the two or more RF channels; and
concurrently transmit the separate time-domain multicarrier waveform on each of the two or more RF channels at a power level that is selected not to exceed a maximum allowable transmit power level for each of the two or more RF channels, wherein the selected modulation level for each of the two or more RF channels is selected based at least in part on the maximum allowable transmit power level for each of the two or more RF channels, wherein the separate time-domain multicarrier waveforms are concurrently transmitted on each of the two or more RF channels, wherein for each RF channel of the two or more RF channels, the power level for each separate time-domain multicarrier waveform is selected so that for each of the two or more RF channels the power level does not exceed the maximum allowable transmit power level for each of the two or more RF channels, and wherein the multi-MCS OFDM transmitter configures each RF channel of the two or more RF channels to have a transmission bandwidth of approximately 1 MHz or 2 MHz by down-clocking a clock signal, wherein the separate time-domain multicarrier waveform transmitted on each of the two or more RF channels is an OFDM signal that comprises a plurality of subcarriers, and wherein one or more of the two or more RF channels occupy spectrum between approximately 700 MHz and 1000 MHz.

2. The wireless communication device of claim 1, wherein a first of the two or more RF channels has a lower maximum allowable transmit power level and a second of the two or more RF channels has a higher maximum allowable transmit power level, wherein based on a difference between the higher maximum allowable transmit power level and the lower maximum allowable transmit power level, paired modulation levels are selected for the first of the two or RF channels and the second of the two or more RF channels such that a power level difference between the paired modulation levels to support a predetermined quality level does not to exceed the difference between the higher maximum allowable transmit power level and the lower maximum allowable transmit power levels.

3. The wireless communication device of claim 2, wherein the multi-MCS OFDM transmitter comprises an encoder associated with each antenna of the plurality of antennas, the encoders being configurable to allow data to be encoded for transmission by each of the plurality of the antennas with a different encoding scheme, and wherein the multi-MCS OFDM transmitter is configured to concurrently transmit a separate time-domain multicarrier waveform on each of the two or more RF channels with a single one of the plurality of antennas.

4. The wireless communication device of claim 3, wherein greater modulation levels are selected for RF channels of the two or more RF channels having a higher allowed transmit power level and lower modulation levels are selected for RF channels of the two or more RF channels having a lower allowed transmit power level.

5. The wireless communication device of claim 3, further configured to receive signals from an access point that indicates the two or more RF channels and the maximum allowable transmit power level for each of the two or more RF channels.

6. The wireless communication device of claim 3, wherein the multi-MCS OFDM transmitter is further configured to:
   map segmented data intended for each of the two or more RF channels to constellation symbols based as on the selected modulation level;
   perform an inverse discrete Fourier transform (IDFT) on the constellation symbols for each of the two or more RF channels to generate a time-domain multicarrier waveform for each of the two or more RF channels;
   reduce a transmit power level of the time-domain multicarrier waveforms associated with a higher power level higher modulation level channel to meet a predetermined performance level; and
   combine the time-domain multicarrier waveform of each of the two or more RF channels for concurrent transmission on a single antenna of the plurality of antennas.

7. The wireless communication device of claim 1, wherein the two or more RF channels are adjacent RF channels within a spectrum.

8. The wireless communication device of claim 1, wherein the two or more RF channels are non-contiguous RF channels within a spectrum.

9. A method for multi-modulation level transmissions comprising:
   encoding data for transmission over two or more radio frequency (RF) channels with a single encoding scheme to generate an encoded data stream;
   segmenting bits of the encoded data stream into a bit stream for each of the two or more RF channels based on a selected modulation level for each of the two or more RF channels;
   concurrently transmitting a separate time-domain multicarrier waveform on each of the two or more RF channels at a power level that is selected not to exceed a maximum allowable transmit power level for each of the two or more RF channels, wherein the selected modulation level for each of the two or more RF channels is selected based at least in part on the maximum allowable transmit power level for each of the two or more RF channels, wherein the separate time-domain multicarrier waveforms are concurrently transmitted on each of the two or more RF channels of the two or more RF channels, wherein for each RF channel of the two or more RF channels, the power level for each separate time-domain multicarrier waveform is selected so that for each of the two or more RF channels the power level does not exceed the maximum allowable transmit power level for each of the two or more RF channels;
   configuring separate time-domain multicarrier waveform for each of the two or more RF channels to have a power level that is selected to support a predetermined performance level and to not exceed the maximum allowable transmit power level for of a corresponding RF channel of the two or more RF channels; and
   configuring each RF channel of the two or more RF channels to have a transmission bandwidth of approximately 1 MHz or 2 MHz by down-clocking a clock signal, wherein the separate time-domain multicarrier waveform transmitted on each of the two or more RF channels is an OFDM signal that comprises a plurality of subcarriers, and wherein one or more of the two or more RF channels occupy spectrum between approximately 700 MHz and 1000 MHz.

10. The method of claim 9, wherein a first of the two or more RF channels has a lower maximum allowable transmit power level and a second of the two or more RF channels has a higher maximum allowable transmit power level, wherein based on a difference between the higher maximum allowable transmit power level and the lower maximum allowable transmit power level, the method includes selecting paired modulation levels for the two or more RF channels such that a power level difference between the paired modulation levels to support a predetermined quality level does not to exceed the difference between the higher maximum allowable transmit power level and the lower maximum allowable transmit power levels.

11. The method of claim 10 wherein the encoding data is configurable to allow data to be encoded for transmission by each of the plurality antennas with a different encoding scheme, and wherein the method further includes concurrently transmitting a separate time-domain multicarrier waveform on each of the two or more RF channels with a single one of the plurality of antennas.

12. The method of claim 10, wherein greater modulation levels are selected for RF channels of the two or more RF channels having a higher allowed transmit power level and lower modulation levels are selected for RF channels of the two or more RF channels having a lower allowed transmit power level.

13. A wireless communication device comprising:
   a cellular transceiver for communicating with base stations of a cellular network in accordance with cellular communication techniques; and
   a wireless network transceiver for communicating with access points of wireless network in accordance with a wireless network communication technique at frequencies between 700 MHz and 1000 MHz, wherein upper-level layers of the wireless communication device are configured to offload data communications from the cellular network to an available wireless network, wherein the wireless network transceiver is a multi-modulation and coding schemes (MCS) orthogonal frequency division multiplexed (OFDM) transmitter comprising:
      at least one radio frequency (RF) chain associated with a single transmit antenna; and
      a variable gain element associated with the at least one of the RF chain to configure separate time-domain multicarrier waveform of an RF channel to have a power level that is selected to support a predetermined performance level and to not exceed a maximum allowable transmit power level for that RF channel, the multi-MCS OFDM transmitter configured to:
   encode data for transmission over two or more RF channels with a single encoding scheme to generate an encoded data stream; and
   concurrently transmit a separate time-domain multicarrier waveform on each of the two or more RF channels at a power level that is selected not to exceed a maximum allowable transmit power level for each of the two or more RF channels, wherein a modulation level for each RF channel of the two or more RF channels is selected based at least in part on the maximum allowable transmit power level for each of the two or more RF channels, wherein the separate time-domain multicarrier waveforms are concurrently transmitted on each of the two or more RF channels, wherein for each RF channel of the two or more RF channels, the power level for each separate time-domain multicarrier waveform is selected so that for each of the two or more RF channels the power level does not exceed the maximum allowable transmit power level, and wherein the multi-MCS OFDM transmitter configures each RF channel of the two or more RF channels to have a transmission bandwidth of approximately 1 MHz or 2 MHz by down-clocking a clock signal, wherein the separate time-domain multicarrier waveform transmitted on each of the two or more RF channels is an OFDM signal that comprises a plurality of subcarriers, and wherein one or more of the two or more RF channels occupy spectrum between approximately 700 MHz and 1000 MHz.

14. The wireless communication device of claim 13, wherein the multi-MCS OFDM transmitter is further configured to segment bits of the encoded data stream into a bit stream for each of the RF channels of the two or more RF channels based on the selected modulation level for each of the two or more RF channels, wherein a first of the RF channels has a lower maximum allowable transmit power level and a second of the RF channels has a higher maximum allowable transmit power level, and wherein based on a difference between the higher maximum allowable transmit power level and the lower maximum allowable transmit power level, the method includes selecting paired modulation levels for the RF channels of the two or more RF channels such that a power level difference between the paired modulation levels to support a predetermined quality level does not exceed the difference between the higher maximum allowable transmit power level and the lower maximum allowable transmit power levels.

15. The wireless communications device of claim 13, wherein the wireless communication device comprises a smart phone having a touch screen.

\* \* \* \* \*